Oct. 31, 1967   J. V. SPALVINS   3,349,817
ELECTRIC MITERING MACHINE
Filed Sept. 29, 1965   3 Sheets-Sheet 1

INVENTOR.
JANIS V. SPALVINS
BY
Roberts, Cushman + Grover
ATTORNEYS

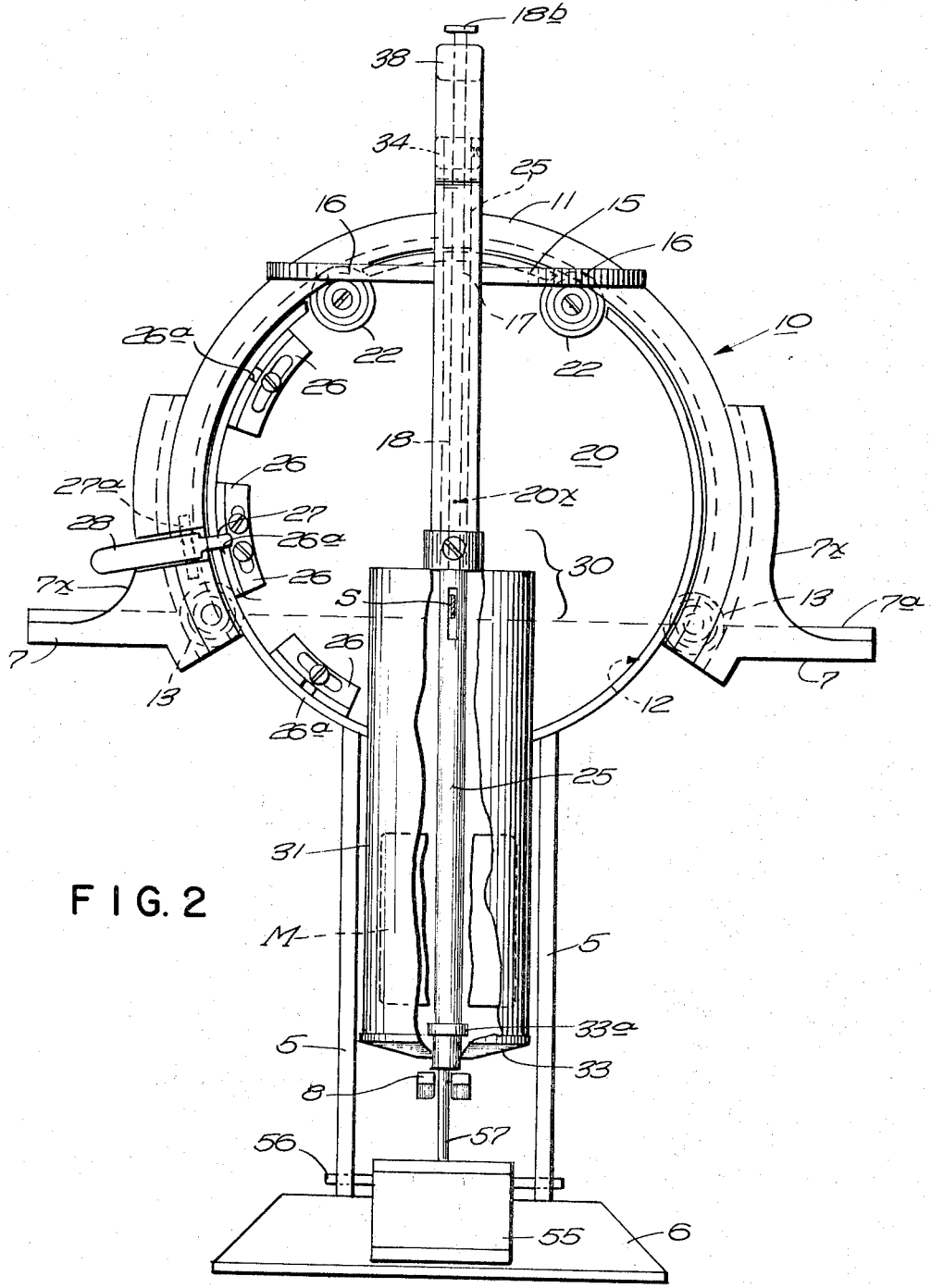

Oct. 31, 1967 J. V. SPALVINS 3,349,817
ELECTRIC MITERING MACHINE
Filed Sept. 29, 1965 3 Sheets-Sheet 3

INVENTOR.
JANIS V. SPALVINS
BY
Roberts, Cushman & Grover
ATTORNEYS

United States Patent Office 3,349,817
Patented Oct. 31, 1967

3,349,817
ELECTRIC MITERING MACHINE
Janis V. Spalvins, 35 Burroughs St., Jamaica
Plain, Mass. 02130
Filed Sept. 29, 1965, Ser. No. 491,228
8 Claims. (Cl. 143—7)

My present invention relates to the field of power tools for use in building construction and carpentry generally. More particularly it aims to provide new and improved means for forming opposed surfaces for jointing as in mitering, primary objects being to provide rugged and reliably accurate mechanism for the stated purpose and which is easily manipulated and adjusted to various cutting angles while at the same time is readily portable bodily.

The machine of the invention is characterized by easy mobility manually and capacity for use at any convenient work area of a given job of carpentry, inside or outside trim and the like. Accordingly the machine is made to stand operatively upon the surface or floor that supports the worker, and it incorporates a work rest or table onto which relatively long strips such as wood molding or trim can easily be fed. With the work so positioned the cross cuts of desired angularity can be made while one foot of the operator is applied to work clamping means accessible at the base of the machine. A built-in motor is actuated to reciprocate the saw blade horizontally while the saw is manipulated vertically by the operator's hand so as to move down into cutting contact with the work. The machine further is adjustable to make straight cuts, angle cuts and bevel cuts as desired.

Figure 1:
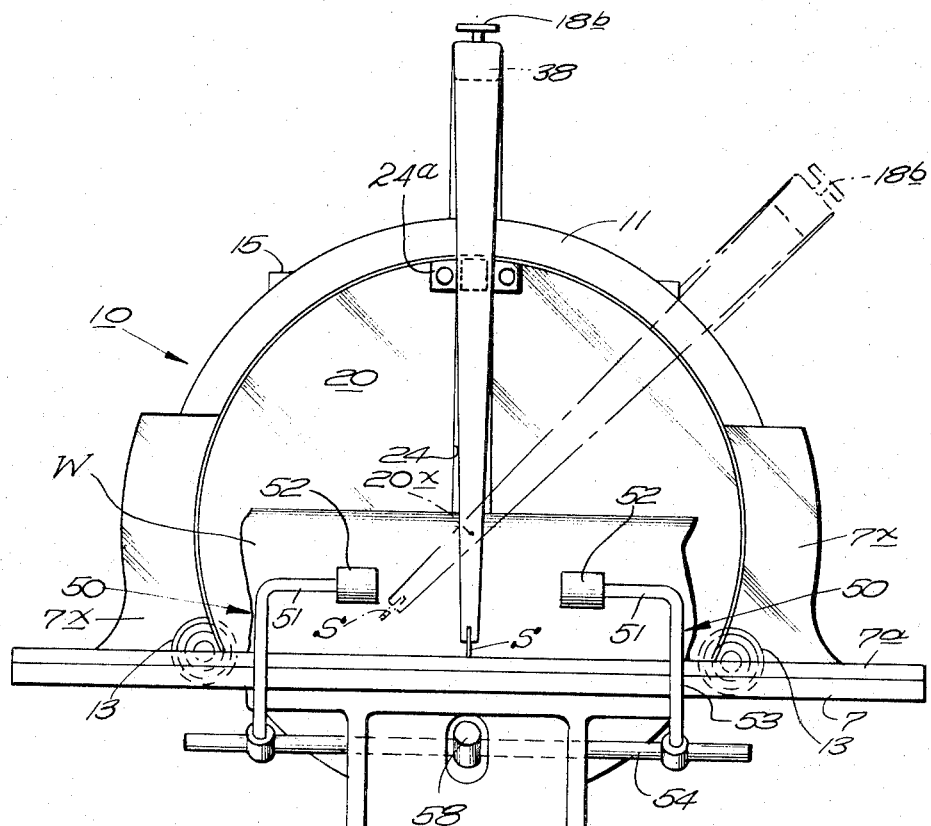
Figure 4:
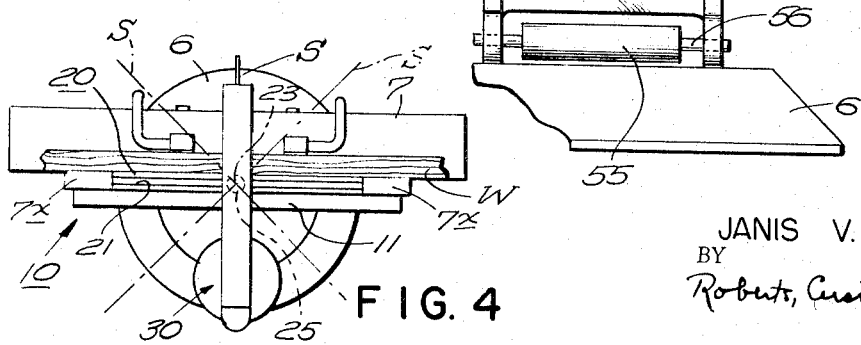
Figure 3:
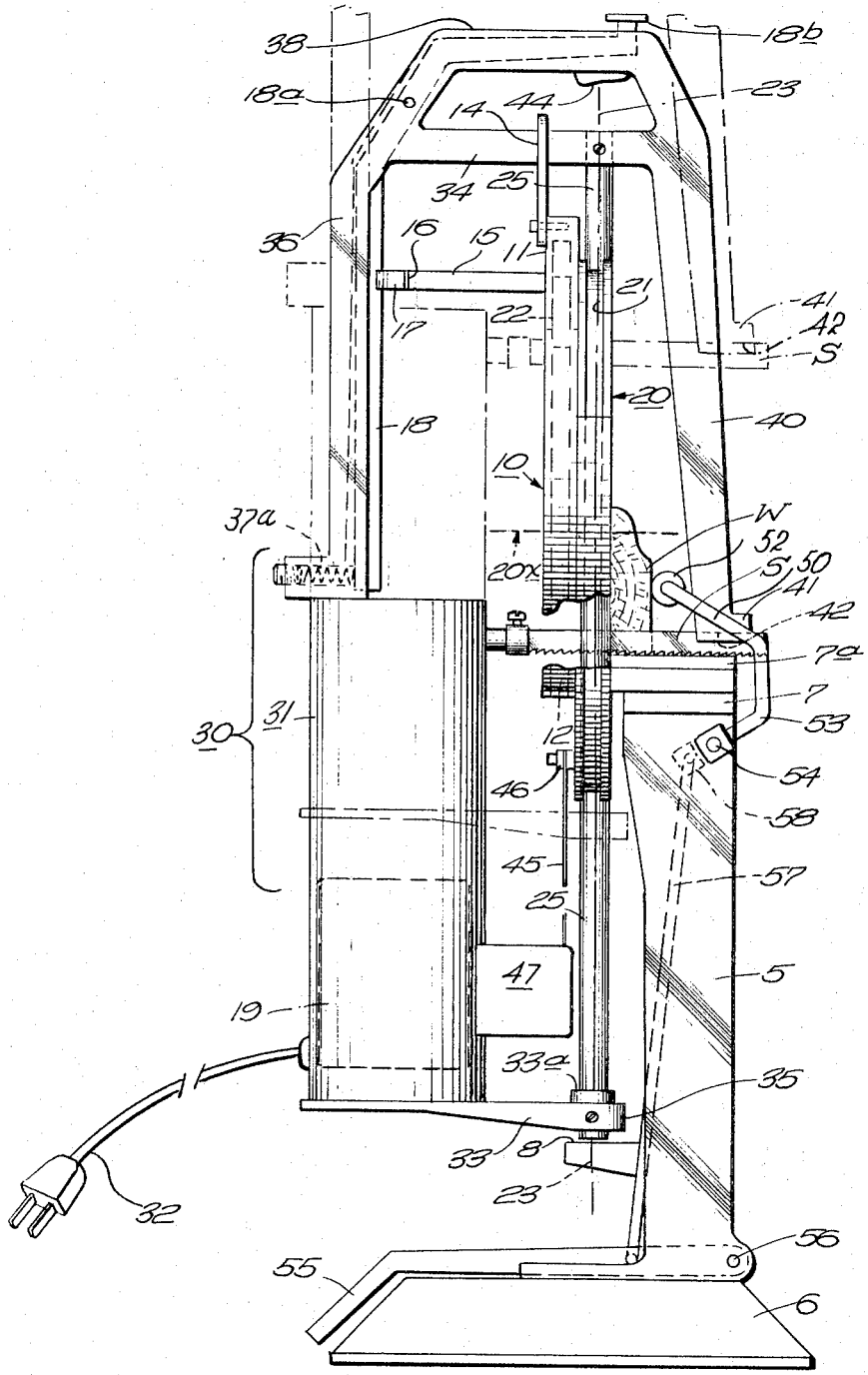

In the accompanying drawings illustrating one embodiment of the invention:

FIG. 1 is a front elevation thereof;
FIG. 2 is a corresponding rear elevation;
FIG. 3 is a side elevation looking from the left at FIG. 1; and
FIG. 4 is a top plan view, partly diagrammatic and on a smaller scale.

In accordance with the invention an exemplary mitering machine as a whole comprises an erect supporting frame including a primary upright or column 5 on a base 6, giving the machine an overall pedestal-like form. Such column 5 is of a height upward from the base 6 to present at a convenient working level a horizontal rest, table or shelf 7 to receive work pieces to be miter cut, such as lengths of molding, baseboard, window sash, trim and other generally elongate pieces of wood or other sawable stock as represented at W (FIG. 3).

Such work rest 7 defines a horizontal plane of support for the work, one longitudinal edge of the rest also locating a vertical plane along the back or inner edge of the rest, such vertical plane to be referred to in considering the various operative motions of the machine, as at 7x. The rest or worktable 7 desirably is provided with a protective top facing 7a adapted to resist slippage of the work on it and being of a material engageable by the tips of the saw teeth without damage to them; see FIG. 3.

Further in accordance with the invention the machine comprises variably positionable mounting means for a power-driven tool of the reciprocating thin-edged blade type commonly referred to as a saber saw. The blade S of such saw is seen in the several views, particularly FIG. 3. Such mounting means or carrier herein enables operation of the saw on and relative to work pieces W upon the rest 7 for severing them transversely along desired selectable angles relative to the mentioned horizontal and vertical planes and to the longer axis of the work, i.e. whether the cut is to be straight across said axis of the work piece or at an angle thereto, either in the horizontal or the vertical planes or both.

Herein such saw mount or carrier comprises a vertically disposed circular track element fixed on and relative to the upright 5 and the work rest 7 and designated generally by the numeral 10. As shown it is cast or otherwise integrally formed with the work rest 7 and extends vertically above it as at 11 in the manner of a central arch spanning between opposite end portions of said work rest or table 7. It has a circular arcuate extent of substantially more than 180°, so as to enclose a tool locator plate 20 sufficiently to define a horizontal axis of rotation therefor and to retain it against displacement radially.

Interengaging guide or track and follower means are provided between the stationary mount or carrier 10–11 and said tool locator plate 20, for guiding rotative adjustment of the latter about a horizontal axis at its center. Such guiding may be variously accomplished. Herein for the purpose of the inner circular edge face of the arch portion 11 of the mount 10 is formed with a channel or track 12 for the guided reception of follower rolls 22, 22 at the periphery of the plate 20, FIG. 2. At another circumferential portion the rotatively adjustable locator plate 20 is itself provided with a peripheral groove or track 21 for guiding coaction with wheels or rolls 13, 13 mounted on said stationary circular mount or carrier means 10, noting FIGS. 1 and 2. The construction and arrangement of the tool locator plate 20 and the stationary mount 10 rotatively supporting it is such that the plate 20 is vertically coplanar with or closely parallel to the mentioned inner edge 7x of the work rest 7.

The described locator plate 20 is further constructed to present an operating space for the saw blade S wherein it can reciprocate in a plane perpendicular to said locator plate and in a line and direction coincident with or closely parallel to the horizontal axis of the plate 20, and also may be bodily moved away from and toward the work rest 7 and in parallelism with itself, for cutting transversely through work pieces such as W on said rest, in the desired angular relation thereto.

For such purpose the plate 20 is fashioned with means for presenting in and along or closely parallel to a diameter thereof an axis (indicated by the broken line marked 23 in FIG. 3) along which the saw unit as a whole is bodily movable slidably toward and from the work and also is angularly shiftable about such axis as a center. In the illustrated machine said axis 23 is physically defined by a shaft 25 to be referred to as the tool-holder shaft, see FIGS. 2 and 3.

From the foregoing description in connection with the drawings it will be apparent that by reason of the close proximity of the locator plate 20 to the work rest 7 and its parallelism with the rear edge 7x thereof such axis 23 and shaft 25 diametrical of the plate 20 will, when vertically positioned as in FIGS. 1 and 2, enable the saw blade S to operate along a cut-line straight across the work and at right angles to the length thereof, or at angles to either side of such right-angular cut, with the apex of the angle adjacent the rear edge 7x of the work rest and approximately coincident with said vertical axis 23. Different operative positions of the blade S are shown by the dash-dot lines in the top plan view, FIG. 4.

To bring such axis 23 as close to the rear edge 7x of the work table as feasible the locator plate 20 has a diametrical channel 24 accurately vertical thereof when said plate is centered in the vertical plane as in FIGS. 1 and 2. The halves of the plate 20 have cross-connecting portions as at 24a, FIG. 1, which are themselves vertically apertured in line with said axis 23, to enable sliding and rotative movement of the mentioned tool-holder shaft 25 in said channel 24 and relative to the plate 20.

The saber saw unit as a whole, shown partly diagrammatically, is designated as 30. It includes a generally cylindrical shell 31 housing an electric motor M having a lead-in power supply cord 32. The saw unit shell also encloses drive gearing connections whereby the toothed blade S is reciprocated in its own plane, which latter coincides with the plane of the axis 23 of the described shaft 25, the longitudinal dimension of the saw blade being substantially horizontal and perpendicular to said axis 23.

Said saw unit 30 is operatively mounted on and by the described tool supporting and guiding shaft 25. This is herein accomplished by rigid cross-connecting means below and above the tool unit and affixed to the lower and upper end portions respectively of the tool-holder shaft 25. Said mounting is such that the saw blade S extends operatively across and in the plane of said shaft axis 23, the shaft having a central saw passage 25s for said purpose, see FIG. 2.

This shaft 25 has a length greater than the diameter of the locator plate 20, so as to project both above and below the latter and thereby to enable it and the tool unit 30 thereon along with the saw blade S to be bodily moved upwardly away from the work rest 7 sufficiently to accommodate the thickest or deepest work pieces W for which the particular mitering machine is designed, such as up to 4 to 6 or 8 inches more or less. Thus in general the radius of the locator plate 20 is at least equal to the major transverse dimension of the work to be sawed, and the tool-supporting guide shaft 25 has a length approximately twice the diameter of the locator plate, enabling the saw to be lifted adequately to clear the blade S well above the work and to be moved down fully through the work for severing it transversely against the supporting table 7.

As earlier noted, the holder shaft 25 is bodily both rotatively and slidably guided on and by the locator plate 20, as by bearings such as 24a thereon. Noting particularly FIG. 3, the supportive connecting means for the tool unit 30 relative to said movable shaft 25 comprises a lower carrier arm 33 affixed at the rear end to the base of the tool unit housing 31 and having at the front end a collar 35 receiving and fixed to the lower end of the shaft 25. Said tool and shaft interconnections further include an upper carrier arm 34 apertured to receive and be anchored on the upper end of the shaft 25. At the rear end, that nearer the operator, such upper carrier arm 34 has an integral depending leg in the form of a longitudinally channeled vertical bar 36 extending down to and attached at the upper part of the tool housing 31.

Spaced above and generally paralleling the upper carrier arm 34 is a bail-form handle 38 straddling the axis of shaft 25 and adapted to be grasped by the tool operator in similar fashion as the hand-grip of an ordinary sadiron. At the outer or front end of the upper carrier 34 and associated with the handle 38 there is integrally or otherwise rigidly connected a depending front leg 40 extending down to the level of the saw blade S. There it terminates in a rigid foot 41 having a down opening fore-and-aft slotted guide 42 straddling the forwardly projecting portion of the saw blade S and affording a supporting guide for it, said guide slot 42 having a continuous length greater than the reciprocating stroke of the saw blade.

On and off control for the saw is provided at a location convenient to the hand of the operator when gripping the main manipulating handle 38. This preferably is by means of a spring-loaded trigger-type switch 44 on the handle 38 and electrically interposed in the saw motor circuit, as through wiring connections extending up from the motor in the tool shell 31 and along in the channel of the upright member 36 which supports the handle.

From the foregoing it is apparent that the entire tool unit 30 together with its holder shaft 25 is bodily movable along a path defined by the axis 23 of said shaft 25. Desirably the tool unit, and said shaft, are normally held up in a position of maximum elevation of the saw blade S above the work rest 7, such as indicated by the upper dotted line position of the parts in FIG. 3. For such purpose said vertically movable elements are counterbalanced or yieldably held up in said position as by spring means such as of the clock spring form 45 having the coiled body portion mounted on the tool housing 31 and the extended end led up and anchored to the locator plate 20 as at 46 at a point thereon adjacent the shaft 25. In the example shown the coiled body of this tool lifter spring 45 is wound on and anchored to a horizontal pin in a box-like projection 47 on the housing 31 of the tool unit.

Means desirably is provided, subject to easy control by the operator, for holding a work piece W such as a length of molding in position on the rest or table 7 while it is being miter cut by the saw blade. Such means as herein illustrated, noting FIGS. 1 and 3, comprises a pair of clamping fingers 50, 50 having horizontal portions 51, 51 with rubber or other gripping elements 52, 52 thereon adapted to be urged against the front portion of the work piece W at opposite sides of the saw blade S and of the cut line to be made by it. Said fingers 50, 50 further comprise upwardly and rearwardly bowed portions 53, 53 secured at the lower ends to a supporting horizontal pivot rod 54 journalled on the upright 5 of the machine. Said work clamping means is conveniently controllable by the operator, herein by a pedal 55 horizontally pivoted as at 56 at the lower portion of the upright 5 adjacent the supporting base 6 thereof. This clamp pedal 55 is interconnected by a vertical link 57, FIGS. 2 and 3, pivoted at its opposite ends to said pedal 55 and to a short central lever arm 58 fixed on the pivot rod 54 on which the clamp members 50 are fastened. Suitable spring means such as a coil spring surrounding the pivot 56 of the pedal 55 normally urges the latter upwardly and the clamp members forwardly, clockwise and to the right in FIG. 3, away from and so as to tend to release the work and normally to stand open to receive it.

From the foregoing in connection with the drawings of one embodiment of a machine of the invention it is apparent that the saber saw unit 30 is afforded the capacity for the several described different bodily movements relative to a work piece W on the rest 7. Since the saw unit 30 including the blade S is affixed to the holder shaft 25, it is shiftable up and down by sliding the shaft 25 axially on and relative to the vertically fixed locator plate 20. This operative motion enables the saw blade S to be elevated away from the work rest 7 sufficiently for positioning of work pieces W on it, of the greatest transverse dimension, thickness or height for which the given machine is designed. Such elevated position is that to which the tool unit is automatically moved by its lifter spring 45, FIG. 3, wherever it is left at rest by the operator, i.e. without deliberate down-thrust upon the handle 38.

In operation, with a work piece W on the table, and held there by the depression of the pedal 55 and resulting engagement of the clamp means 50, 51 against the work, the operator grasps the handle 38, trips the underlying switch 44, FIG. 3, to energize the saw motor, and gradually moves the tool unit downwardly by pushing down on said handle 38. This causes the reciprocating saber saw blade S to travel in self-parallelism down through the work, making a cut-off kerf across it with complementary opposed miter joint faces at the adjacent severed pieces of the work. The limits of such up and down travel of the tool may be positively set by suitable limiting means, such as the lateral projection 8, FIGS. 2 and 3, on the machine column 5 below the bottom end of the shaft 25 as a downstop for it. An up-limiting stop is provided by the lower edge of the mounting track 10 of the tool locator plate 20, the lower carrier arm 33 having a resilient cushioning washer 33a at its upper face for upward stopping engagement with said track element 10.

It is here further noted that the palm-conforming hand grip 38 of bail or inverted U-form also provides a convenient means for lifting and moving the entire mitering machine from one place to another, whether in shifting it about at the particular job location or otherwise. This may be accomplished by merely lifting on said grip handle 38 when it is in spring-elevated top position. Since with the larger sizes of the machines such maximum elevated position of the handle may bring it to a level higher than will comfortably accommodate the operator's hand with his arm fully extended, provision may be made for temporarily locking the tool unit down in a lower or lowermost position, such as in full line in FIG. 3. For this purpose a pivoted hook-latch 14 may be mounted on the top arch portion of the tool mount 10 and having a nose adapted to be engaged over the crossarm 34 adjacent the hand grip 38 to firmly hold down the tool unit 30 against the urge of its elevating spring. This affords the operator a grip upon the machine at a level convenient for lifting and moving the machine bodily, with the operator's arm substantially extended rather than crooked at the elbow.

The described up and down travel for the saw tool unit takes care of all cut-offs that are to be made in the vertical plane and straight across the work at right angles to its longitudinal axis. For many purposes, as for example, the joints at the corners of a picture frame, cuts other than straight across at 90° are desired, such as 45° in the picture frame example. Correspondingly appropriate adjustment of the line of the saw blade S relative to the longitudinal axis of the molding or other work piece is afforded by rotary swinging of the tool unit bodily about the described vertical or up-and-down axis 23 of the holder shaft 25. In considering this angular adjustment it will be assumed that the locator plate 20 is symmetrically disposed, i.e. with the shaft 25 in the true vertical plane, as shown in full line in FIG. 1 and in FIG. 2.

Before turning to said angular adjustment, it is noted that means is herein provided for operatively retaining the tool with the saw blade S at the desired angle in the horizontal plane and relative to the longitudinal work axis, around the axis of the holder shaft 25. For this purpose there is formed on or secured to the top central back face of the locator plate 20 a rearwardly projecting arcuate flange or segment 15, FIGS. 2 and 3, concentric with the axis of said shaft 25.

Releasable locking mechanism is supplied operatively between the tool unit 30 and said segment 15, such as herein illustrated in FIG. 3, and seen also in FIG. 2. The segment 15 has appropriately located positioner notches as at 16 (FIG. 3) for entry by a detent 17 on an operating lever 18 horizontally pivoted as at 18a on the upper carrier arm 34 or the adjacent rear portion of the handle 38.

Such detent control lever 18 has a forwardly and horizontally extending portion above its pivot point 18a with a push button 18b presented conveniently to the thumb of the operator's hand when grasping the handle 38. This detent control lever 18 extends downward along the vertical channel of the earlier mentioned rear vertical leg 36 of the movable unit, upstanding from the housing shell 31 of the tool. Near the lower end said lever 18 is subject to loading by a spring 37a, FIG. 3, normally acting to bias the detent 17 into locking seated engagement in one of a plurality of notches 16, from which it is releasable by down pressure of the operator's thumb upon the release button 18b. Thus by merely depressing the button 18b the tool unit is freed relative to the stationary holding segment 15, so that the operator grasping the handle 38 is enabled to swing the tool horizontally about the vertical axis of the shaft 25. It will be understood that one such notch 16 is presented centrally of the segment 15 for 90° straight-across sawing, with others to each side of it as for 45° to the right or to the left about the axis of shaft 25, and such other locations as may be desired for particular circumstances as a given job may dictate.

For some mitered joint formations it may be necessary or desirable to perform the cut in other than a vertical plane, as for example, such that the two end faces will adjoin along an incline with the two bevelled end portions mutually lapped above and below each other; i.e. the kerf is slantingly undercut either toward the right or to the left of the true vertical as defined by the machine pedestal. Such bodily adjustment of the saber saw S is effected by rotating the locator plate 20 about its own horizontal central axis 20x on and relative to the tool mount 10 as a whole. This is accomplished by the hand of the operator grasping the handle 38 and pushing either to the right or to the left, with reference to FIGS. 1 and 2, thereby bodily swinging the shaft 25 and the entire tool unit 30 with it to an off-vertical inclined position such as shown in phantom on FIG. 1.

Means for locking the locator plate 20 in selected vertical or different angular positions about its axis 20x desirably is provided, one simple and convenient form being shown in FIG. 2. There the rear face of the locator plate 20 has adjustably mounted near the periphery a plurality of blocks 26 having locking notches 26a. These are adapted to be entered selectively by a latch 27 pivoted as at 27a on the stationary mount 10 and having coil spring means associated with its pivot for urging its inner locking end into seating engagement with any notch 26a of the locator plate that is brought opposite to it. At the outer end of the latch is a projecting finger piece 28 readily accessible to the operator for controlling this locator plate locking means and thereby the angularity of the plate 20 about its horizontal axis 20x.

It will be further observed that if angulation of the cut-line or miter joint simultaneously in two planes is desired, that is, at a compound angle wherein the plane of the saber saw cut is not only swung horizontally about a contained vertical axis (as that of shaft 25) but also about a contained horizontal axis (as that of locator plate 20) such compound adjustment is herein instantly available with the mitering machine as illustrated and described by way of example. Thus it selectively affords, as earlier mentioned, straight cuts, angle cuts, bevel cuts and combinations thereof.

From the foregoing it is apparent that the mitering machine of the invention is characterized by an upright pedestal-like form having a main vertical axis substantially central of the machine, defining a central line of symmetry and mass or weight for the machine. A yoke-form handle at the upper end of said center line provides for balanced bodily lifting and carrying of the machine as a whole, and also for operation and control of the tool. The saber saw cutter is arranged to reciprocate perpendicularly to such center line, and to move along or parallel to it for straight cuts, to be pivoted horizontally about it for angular cuts and to be tilted about an axis at right angles to such center line for bevel cuts. For all such operations the generally elongated work pieces are supported on a stationary horizontal rest, normal to the pedestal and its center line, and with one long edge of the rest intersecting said line perpendicularly. The saw unit is mounted on and controlled by a shaft adapted to stand in a central vertical position, for plain straight cuts by the saw, in which it is substantially coincident with or closely parallel to said machine pedestal center line. And said saw-mount supporting shaft is itself movably mounted to slide axially in the direction of its axis, to rotate about said axis and also to be swung rotatively about a horizontal axis normal to the shaft axis, whereby the various miter cuts and combinations thereof are readily available at the will of the operator and with minimum manipulative effort on his part.

From the foregoing description taken with the drawings it is evident that applicant's invention provides a mitering machine in a compact form easily carried to the site of use, instantly ready for operation on plugging into an electric power supply, and which the user may readily pick up with one hand and bodily move to the preferred point of use. Such may be at various locations upon the floor of a building under construction, alteration or repair, or upon a work platform, deck, or other generally level supporting surface on which the operator is to stand. And as above noted, characterizing features contributing to attainment of the objectives of the invention include a pedestral form of basal support, a forwardly open work rest at convenient working height above the floor and adapted for broadside reception of work pieces, a single carrying and operation controlling handle element preferably at the topmost central position on the machine, mechanical clamping of the work under pedal control of the operator during actuation of the machine, and especially means and arrangement whereby an electric motor-driven saber saw is enabled to be utilized as the active cutting element of the novel mitering machine combination as herein disclosed.

My invention will be understood as susceptible of various modifications as to form, proportion and details of means within the spirit of and affording the advantages of the invention.

I claim:

1. A mitering machine comprising a portable upright supporting frame having a horizontal work-receiving rest at convenient operating height above the machine supporting floor, mounting means on the frame for operatively presenting an electric-powered straight-bladed saw unit with capacity for bodily movement in self-parallelism toward and from work on said rest for saw-cutting the same, said means including provision for angularly variably positioning the saw blade about mutually perpendicular axes in the plane of the blade, and means for releasably locking the saw in the selected angular position about said axes.

2. A mitering machine according to claim 1, wherein said variably positioning provision comprises a generally circular locator plate vertically disposed on the frame and held for adjustable rotation about a horizontal axis at its center.

3. A mitering machine according to claim 2, including a normally vertical holder shaft extending diametrically of the locator plate in the plane thereof and having guide bearings on said plate wherein it is rotatively and axially slidably held.

4. A mitering machine according to claim 3, wherein the saw unit is held in radially offset position on and by said holder shaft and the saw blade reciprocates centrally through the body of the shaft.

5. A mitering machine comprising a supporting upright presenting a horizontal work table extending transversely of the machine, a saber saw unit, a holder shaft having said unit fixed thereon in radially offset relation for reciprocation of the saw blade transversely to the shaft axis and in the plane thereof so as to cut work pieces on said table, and means for mounting said shaft on said upright with capacity for bodily movement of the saw unit in the direction longitudinal of the shaft axis toward and from the work table and also angularly about said shaft as well as about an axis perpendicular to said shaft axis and containing the saber saw blade.

6. In a machine for saw-cutting generally elongated work pieces to form opposed transverse surfaces at equal or supplemental angles, a portable upright standard presenting a longitudinal rest for such work pieces, a saw holder element, a reciprocating electric motor-driven saber-type saw operatively disposed on said holder element, and means positioning said holder element on said standard with capacity for adjustment relative to it about axes mutually perpendicular to each other and for moving the saw toward and from the work in the direction of one of said axes.

7. In a portable electric mitering machine, an upright support presenting a horizontal shelf for work pieces to be saw cut, a circular holder plate revolvably mounted on the support in a vertical plane and with the plate center adjacent mid-length of the work shelf, bearing means at the face of the holder plate opposite to the work shelf for slidably and rotatively supporting a shaft having its axis along a diameter of said plate, and a reciprocating straight-edge electric motor-driven saw bodily carried by said shaft in radially offset relation to it for operation in the plane of the shaft axis.

8. In a machine for saw-cutting work pieces along surfaces for abuttive jointing thereof at equal or supplemental angles, an upright frame movably positionable operatively on a horizontal surface such as a floor, a fixed horizontal rest for work pieces at about knee height on the frame, a saber saw unit on the frame with the longitudinal axis of the saw blade horizontal, a saw unit supporting shaft perpendicular to said saw blade axis, and carrier means between said shaft and the machine frame and movable relative to it to raise and lower the saw for admitting work pieces to and cutting them on said rest and also to shift the plane of cut of the saw blade selectively about a vertical axis or a horizontal axis, or both.

No references cited.

DONALD R. SCHRAN, *Primary Examiner.*